M. W. MIX.
AIRPLANE FUSELAGE.
APPLICATION FILED MAR. 15, 1918.
1,402,431.
Patented Jan. 3, 1922.
2 SHEETS—SHEET 1.
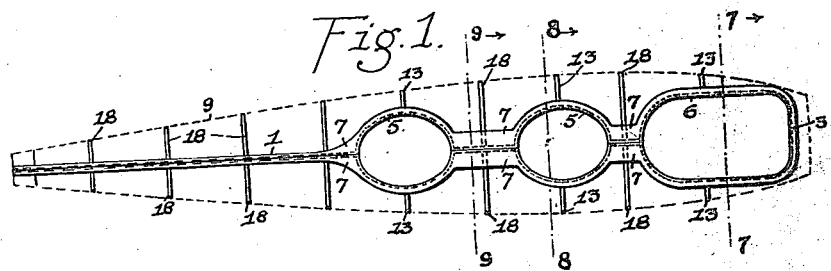
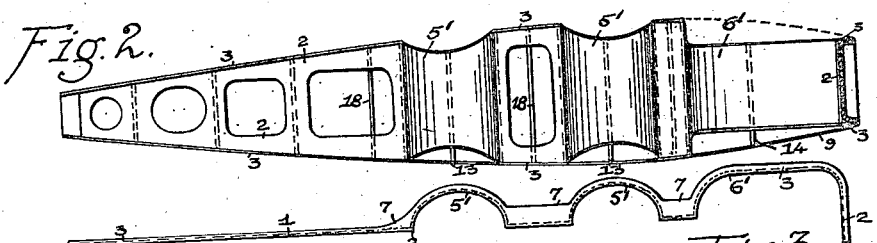
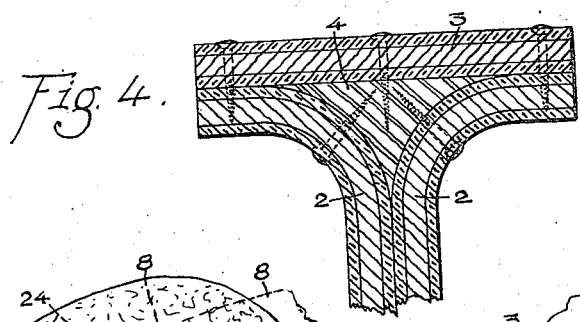
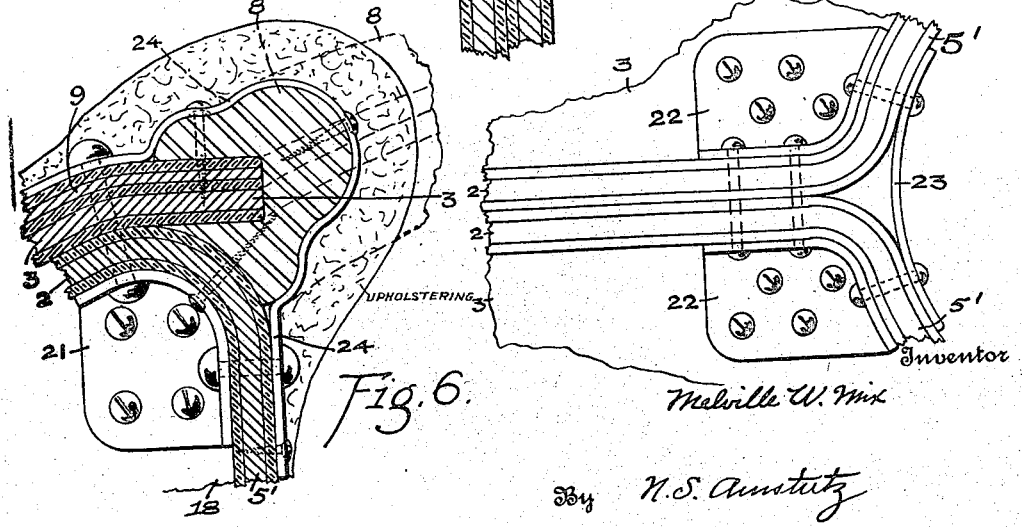
Inventor
Melville W. Mix
By N. S. Amstutz
Attorney

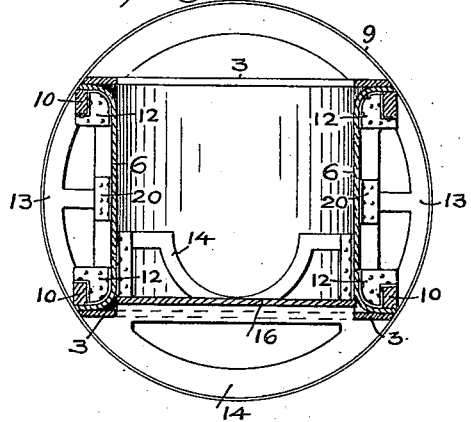
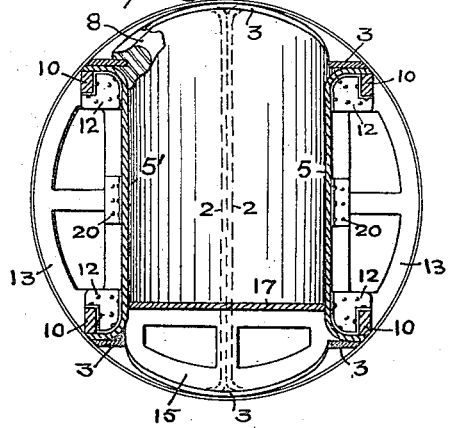
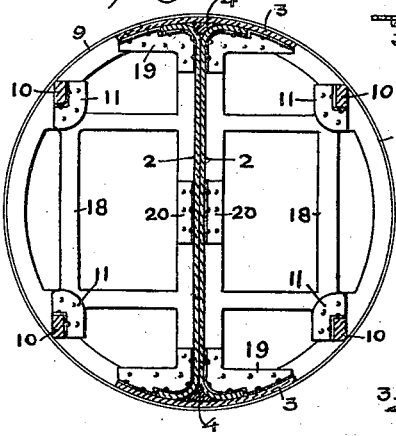
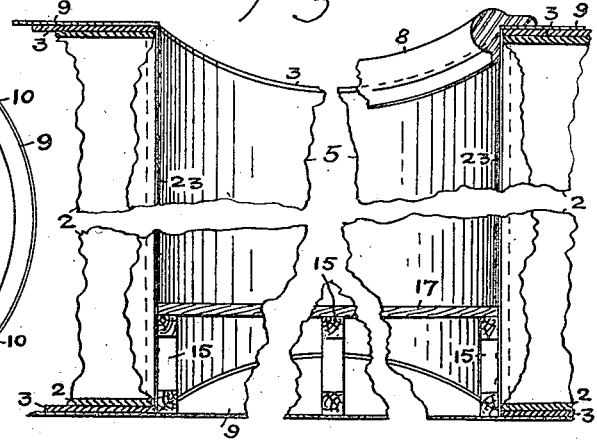
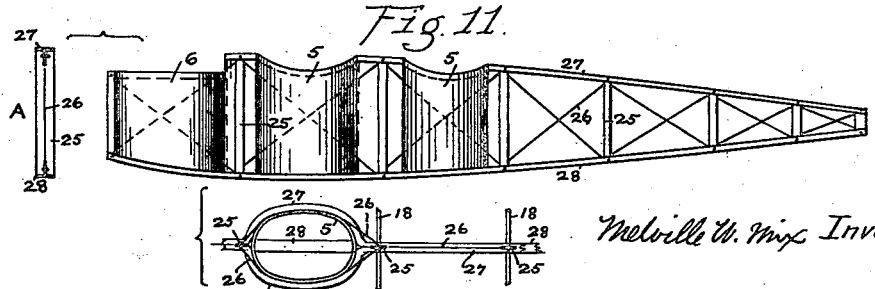

UNITED STATES PATENT OFFICE.

MELVILLE W. MIX, OF MISHAWAKA, INDIANA.

AIRPLANE FUSELAGE.

1,402,431. Specification of Letters Patent. Patented Jan. 3, 1922.

Application filed March 15, 1918. Serial No. 222,595.

*To all whom it may concern:*

Be it known that I, MELVILLE W. MIX, a citizen of the United States, residing at Mishawaka, in the county of St. Joseph and State of Indiana, have invented certain new and useful Improvements in Airplane Fuselages, of which the following is a specification.

My invention relates to improvements in airplane fuselages and it more especially consists of the features hereinafter pointed out in the annexed claims.

The purpose of my invention is to provide an improved form of fuselage that combines a maximum of strength with a minimum of weight and that does not require the special use of unusual materials in its construction; that secures extra rigidity in the line of greatest stress through the use of a continuous girder-like form of back bone extending from the tail to the head; which embodies a composite type of construction composed of laminæ formed of tough woods that are not rare or difficult to secure; that carries the back bone unbroken around the cock pits and engine compartment in such a way as to reinforce these portions of the fuselage so that the strength as a whole will not be weakened at these points; and that provides a composite structure member for use in the back-bone or otherwise which in shape approximates well known standard types of metallic I beams and channels.

With these and other related ends in view I illustrate in the accompanying drawings such exemplifications of adaptation as will disclose the broad underlying features of the invention without limiting myself to the specific details shown.

Fig. 1 is a diagrammatic plan of a skeletonized fuselage.

Fig. 2 is a diagrammatic elevation of Fig. 1 of one-half of a laminated back-bone.

Fig. 3 is a diagrammatic plan of a detached one-half of a back-bone member.

Fig. 4 is an enlarged cross section of a part of an I beam form of composite structural member.

Fig. 5 is an enlarged plan instancing how the web portion of a back-bone divides fore and aft of the cockpits, etc.

Fig. 6 is an enlarged cross section of a protective rail and fastenings placed around the upper edge of the cockpits, etc.

Fig. 7 is a diagrammatic cross section through the engine compartment on line 7—7 of Fig. 1.

Fig. 8 is a similar cross section on line 8—8 of Fig. 1.

Fig. 9 is a diagrammatic cross section on line 9—9 also of Fig. 1.

Fig. 10 is a diagrammatic elevation in section lengthwise of a cockpit.

Fig. 11 is a diagrammatic elevation of a fuselage back-bone in which a lattice girder type of construction is instanced in connection with continuous compartment enclosures, a transverse section is shown at A and a detached plan at B.

In practically carrying out my invention, I may use various types of back-bone construction and different combinations of lamellar elements other than those instanced in the accompanying drawings without departing from the spirit of my invention. It is to be noted that no limitations whatever are admitted on account of the relative proportion of the different parts shown in the drawings as these are susceptible to large variations according to the exigencies of use and the theoretical judgment of designing engineers.

The back-bone 1, in one form may be made of laminated channels 2 whose flanges are joined by the transverse members 3 shown in Fig. 4 in which a triangular filler 4 is placed within the opening bounded by the flanges of channels 2 and the member 3 to form a composite whole of exceptional strength and of very light weight. This form of structure member may be made of any desired dimensions to suit the specific needs of back-bones as instanced, or of struts, spars, longérons, etc., or different parts of airplanes or other structures. The use of this type of "I beam" is not limited to airplane purposes though its unique features are specially applicable to this class of service on account of its inherent characteristics which combine great strength with minimum weight by using woods that are readily procurable in ample quantities.

The requirements of airplane service are such that unlaminated members which meet the stringent tests to which they are subjected and the inspections that must be passed are but a small percentage of the gross wood supply submitted. This involves a tremendous loss, and an attendant increase in cost without, in the end, attaining the desirable results that may be secured through the use of lamellar members.

In attempting to form a continuous single unit back-bone reaching from head to tail difficulties are encountered at the engine and other compartments, through which it is impossible to have the back-bone pass. If the elements of the back-bone are stopped at such compartments the "chain will be no stronger than its weakest link" and the attained "strength" will really be an element of weakness, in that there is no provision for carrying the stresses unbroken around the compartments.

In the instances of adaptation shown, this difficulty is overcome by separating the webs of the two channels which form the body of an I beam section into two separate members 5' where they curve around the cockpits and the webs 6' around the engine compartment 6 as shown in Figs. 3 and 5. At the head end they may meet as a single channel as shown in Fig. 1 or as separate halves shown in Fig. 3.

The upper and lower transverse members or flanges 3 at points 7 may be widened to serve as transverse braces. The halves 2 of the back-bone may be bent into the required shape under pressure and fastened to each other where the webs lie side by side in any suitable manner. At the points where the channels separate into curved webs 5' and 6', as shown in Fig. 5 metal angle plates 22 may be used between the webs 2 and 5' and flanges 3 and a supporting plate 23 running vertically ties the two halves together. Around the rim of each cock pit a protective strip 8 may be placed as instanced in Fig. 6. The strip 8 is grooved where needed to receive the inner edge of flange 3. Bands 24 are secured to the shell 9, the strips 8 and webs 5' (Fig. 6) at as many points as are desired or any other method of fastening may be used.

It is immaterial as to the shape the fuselage shall have in cross section, whether round, oval or more or less square shaped. The back-bone (Fig. 1) has attached to it on both sides ribs or frames 18 to which the shell 9 is secured. On each side of the cock pits 5 and engine compartment 6 narrow frames 13 are placed. Under the engine a separate frame 14 or several of them is placed. These may support a floor 16 if the latter is desired. Separate frames 15 of different lengths may be placed across the bottom of the cock pits 5 (Fig. 10) and a floor 17 supported thereon.

The frames 18 are secured to the longérons 10 by means of thin metallic angle plates 11 (Fig. 9) and to the back-bone by angle plates 19. Frames 13 are attached to longérons 10 and webs 5' or 6' (Figs. 7 and 8) of channels 2 by angle plates 12. The angle plates 20 serve to hold the center portion of the webs 2, 5' or 6' to the midportion of frames 18 and 13. Angle plates similar to 20 may also be used to secure frames 14 to webs 6' (Fig. 7). In case a separate support is needed between any of the ribs and the sides of a cock pit where a longéron 10 cannot be combined therewith a plate 21 may be used (Fig. 6). The shell 9 may be formed of thin laminations covered with linen or in any desired manner and it may be fastened to the ribs and back-bone in any way that is found available, by screws, etc., or otherwise.

If the back-bone is made in the form of a lattice girder (Fig. 11) the cock pits 5 and engine compartment side walls may be made of a continuous laminar member simulating vertical tubes so as to provide ample rigidity at this point to withstand any side strains that may be imposed. The upper and lower girder members 27 and 28 pass around these walls on both sides, suitable struts 25 join members 27 and 28 and diagonal tie wires 26 serve to hold the struts, etc., rigid. The usual ribs or bulk head frames 13 and 18 may be attached to the struts 25 in any suitable manner. Diagonal tie wires 26 pass around the walls of the cock pit 5 and engine compartment 6 (See B, Fig. 11). It is only necessary for the upper member 27 to pass around the rim of the compartment walls as the bottom member 28 may pass directly along the center from end to end. These features are made the subject of a separate application, Serial Number 516,410, filed Nov. 19, 1921.

It will be seen that the structure is extremely simple and of exceptional strength in view of its very light weight. The invention is of commanding importance in that the longérons principally serve to hold the bulk head frames apart from each other the required distance, thus placing the main strains on a centralized single member as against the usual four longérons. The idea of a single back bone member in airplane fuselages is claimed in its broadest sense without specific limitations to structural expedients because these may be widely varied without departing from the fundamental features of the invention.

It is immaterial how the channels 2 are held together. This may be done by means of screws, water proof or other cement, etc., according to the class of work in which it is expected the same may be used. In any event when used as struts or spars etc., the composite structure forms a complete unit in and of itself adapted to various purposes.

The specific arrangement of the ribs 13 and 18 with respect to the cock pits 5 and engine compartment 6 must be such as to meet the necessities for sub compartments to provide room for wireless apparatus, photographic outfits, ammunition etc., hence they are not limited in any sense to the exact positions shown but may be shifted as desired. The side edges of the cock pits in practice are covered with upholstering of leather and hair and their contour is such as to allow full leeway and freedom of arm movement.

What I claim is,

1. In airplane fuselages, a composite continous back-bone member comprising separate halves extending from end to end, a plurality of compartments placed therein between such halves wherever desired whereby an unbroken longitudinal supporting member is formed without encroachment on the compartments, and means for holding the halves in engagement with each other at points not occupied by compartments.

2. In airplane fuselages, a continuous composite back-bone member comprising separate halves extending from end to end, a plurality of compartments placed therein between such halves wherever desired whereby an unbroken longitudinal supporting member is formed without encroachment on the compartments, means for holding the halves in discontinuous contact with each other, suitable transverse rib members attached to the "back-bone", and a covering thereover.

3. An airplane fuselage comprising a body formed in opposite halves of moulded ply-wood continuous from end to end of the fuselage, curved-out portions in each half registrable with each other to form compartments therebetween and at other portions of the fuselage said halves lie side by side, transverse ribs attached to and projecting from the body on the sides thereof, a suitable floor for the compartments, a cover for the body, and means for holding the parts assembled.

4. In airplane fuselages, a moulded plywood body comprising two oppositely formed halves having recesses therein, means for assembling such halves with the non-recessed portions adjacent each other and the recessed portions spaced apart to form compartments therebetween, a cover therefor, and supports for the cover between it and the body.

5. In airplane fuselages, a ply-wood half-body constituting a right-hand member, a similar left-hand member, oppositely placed depressions formed in each member, and undepressed portions between the depressions the said depressions being adapted when the members are assembled with the depressions opposite each other to form compartments, and means for holding the members assembled one against the other.

6. In airplane structures, a fuselage comprising a composite two-part central body member extending from end to end of the fuselage, the said composite member having openings between its parts at desired locations adapted to serve as compartments.

7. The process of forming airplane fuselages, consisting in shaping ply-wood halves into right and left hand members, in forming related depressions in the halves, in assembling the halves with the depressions opposite each other, and in securing the halves to each other.

8. In airplane fuselages, a continuous composite central supporting member composing two halves formed with openings between the halves serving to define compartments, transverse ribs attached thereto, and a suitable covering to the supporting member.

9. In airplane fuselages, a continuous composite central member comprising two halves formed with openings between the halves which serve to define compartments, and a shell or cover of desired extent supported by the said member.

In testimony whereof I affix my signature.

MELVILLE W. MIX.